United States Patent
Phillips (10) Patent No.: US 9,970,759 B2
(45) Date of Patent: May 15, 2018

(54) SENSOR AND METHOD FOR IDENTIFYING DOWNED POWER TRANSMISSION CONDUCTORS AND STRUCTURES

(71) Applicant: Electric Power Research Institute, Inc., Charlotte, NC (US)

(72) Inventor: Andrew John Phillips, Harrisburg, NC (US)

(73) Assignee: ELECTRIC POWER RESEARCH INSTITUTE, INC., Charlotte, NC (US)

( * ) Notice: Subject to any disclaimer, the term of this patent is extended or adjusted under 35 U.S.C. 154(b) by 92 days.

(21) Appl. No.: 14/474,733

(22) Filed: Sep. 2, 2014

(65) Prior Publication Data
US 2016/0061603 A1    Mar. 3, 2016

(51) Int. Cl.
| G01R 15/18 | (2006.01) |
| G01C 9/02 | (2006.01) |
| H02G 1/02 | (2006.01) |
| H02G 7/02 | (2006.01) |

(52) U.S. Cl.
CPC ............... *G01C 9/02* (2013.01); *H02G 1/02* (2013.01); *H02G 7/02* (2013.01)

(58) Field of Classification Search
CPC .... H01B 7/04; G01R 15/142; G01R 19/2513; G01R 15/18; G01R 27/14; G01R 31/021; G01R 31/085; G01R 31/1272; G01R 33/3854; H01R 4/62; H01R 13/5812; H01R 13/5833; H01R 9/0524; H02G 1/02; H02G 7/04; H02G 7/00; H02G 7/02; G01C 9/06; G06F 2217/78; G06F 2217/80; H02J 3/005; H04L 5/06
See application file for complete search history.

(56) References Cited

U.S. PATENT DOCUMENTS

| 4,224,612 A | | 9/1980 | Macey | |
| 4,635,055 A | * | 1/1987 | Fernandes | G01K 1/024 323/357 |
| 4,728,887 A | * | 3/1988 | Davis | G01R 15/14 324/127 |
| 4,747,216 A | * | 5/1988 | Kelly | G01C 9/10 33/1 PT |

(Continued)

FOREIGN PATENT DOCUMENTS

| EP | 2006699 | 12/2008 |
| JP | 0062278465 | 12/1987 |

(Continued)

OTHER PUBLICATIONS

A. Semenova, WIPO International Search Report for PCT/US2012/051699, Nov. 9, 2012, Russia.

(Continued)

*Primary Examiner* — Vinh Nguyen
(74) *Attorney, Agent, or Firm* — Trego, Hines & Ladenheim, PLLC; Brandon Trego; Jonathan Hines (57) ABSTRACT

A sensor and method for identifying a downed power transmission conductor or structure is disclosed. The method includes the steps of securing a sensor to a power transmission conductor or structure, using the sensor to measure inclination of the power transmission conductor or structure, comparing the measured inclination to a set threshold, and alerting a utility if the measured inclination exceeds the set threshold.

8 Claims, 6 Drawing Sheets

(56) References Cited

U.S. PATENT DOCUMENTS

| | | | |
|---|---|---|---|
| 4,758,792 A | 7/1988 | Polonis et al. | |
| 4,847,780 A | 7/1989 | Gilker et al. | |
| 5,454,272 A * | 10/1995 | Miller | G01L 5/042 |
| | | | 73/862.391 |
| 5,610,512 A | 3/1997 | Selcuk | |
| 6,205,867 B1 | 3/2001 | Hayes et al. | |
| 6,523,424 B1 | 2/2003 | Hayes et al. | |
| 6,633,169 B1 | 10/2003 | Cavigelli | |
| 6,788,426 B1 | 9/2004 | Sharp et al. | |
| 7,002,331 B2 | 2/2006 | Sae-Ueng et al. | |
| 7,067,829 B2 | 6/2006 | Richards et al. | |
| 7,282,944 B2 * | 10/2007 | Gunn | G01R 15/142 |
| | | | 324/764.01 |
| 7,369,045 B2 | 5/2008 | Hansen | |
| 7,421,258 B2 | 9/2008 | Bauschke et al. | |
| 7,486,084 B2 | 2/2009 | Phillips et al. | |
| 7,494,271 B2 | 2/2009 | Scholtz et al. | |
| 7,615,132 B2 | 11/2009 | Yasui et al. | |
| 7,620,517 B2 | 11/2009 | Scholtz et al. | |
| 7,641,387 B2 * | 1/2010 | Engelhardt | G01C 9/00 |
| | | | 374/110 |
| 7,733,094 B2 * | 6/2010 | Bright | G01R 15/142 |
| | | | 324/127 |
| 7,748,269 B2 | 6/2010 | Shenzhen | |
| 7,786,894 B2 | 8/2010 | Polk et al. | |
| 7,808,250 B2 | 10/2010 | Honda et al. | |
| 9,158,036 B2 * | 10/2015 | Liu | G01W 1/02 |
| 2007/0013199 A1 | 1/2007 | Hall et al. | |
| 2009/0243876 A1 * | 10/2009 | Lilien | H02G 1/02 |
| | | | 340/870.01 |
| 2010/0100239 A1 | 4/2010 | Park et al. | |
| 2011/0101989 A1 | 5/2011 | Hyde et al. | |
| 2012/0092115 A1 | 4/2012 | Srinivasrao et al. | |
| 2013/0022078 A1 * | 1/2013 | Phillips | G01R 1/22 |
| | | | 374/179 |
| 2013/0205900 A1 * | 8/2013 | Nulty | H02J 3/00 |
| | | | 73/514.01 |

FOREIGN PATENT DOCUMENTS

| | | |
|---|---|---|
| JP | 2000131258 | 9/2004 |
| KR | 101040732 | 6/2011 |
| RU | 2212678 | 9/2003 |
| RU | 2233754 | 8/2004 |
| RU | 89792 | 12/2009 |
| SU | 724338 | 3/1980 |
| SU | 1305031 | 4/1987 |
| SU | 1642530 | 4/1991 |

OTHER PUBLICATIONS

Y. Usikova, WIPO International Search Report for PCT/US2012/051695, Nov. 21, 2012, Russia.

O. Schedrina, WIPO International Search Report for PCT/US2012/072012, Mar. 13, 2013, Russia.

O. Schedrina, WIPO International Search Report for PCT/US2012/072023, Mar. 21, 2013, Russia.

Sorqvist, Outdoor polymeric insulators long-term exposed to HVDC, IEEE Trans. on Power Delivery, V. 12, No. 2, Apr. 1997, p. 1041-1048.

MetersUSA, Current Transformers Principles of Operation, p. 1-4, no date, www.metersUSA.com.

Vishay, Resistors—Linear—Current Sensing, p. 1-4, 2014.

Meder, How reed switches are used with a permanent magnet, p. 28-34, www.digikey.com, no date.

Asea, Earth-fault protective relays with open-core current transformers, p. 1-12, Ed. 2, Feb. 1976.

Kurihara, Construction of remote monitoring system for separate measurement of leakage current of outdoor insulators, p. 401-404, Jun. 1-5, 2003, Proc. of 7th Inter. Conf. on Properties and Apps. of Dielectric Materials, Nagaya, Japan.

Pylarinos, Impact of noise related waveforms on long term field leakage current measurements, IEEE Trans on Dielectrics and Electrical Insulation, V.18, No. 1, Feb. 2011, p. 122-129.

OSKF, Current Transformers, P. 1-4, Alstom, no date.

Flex-Core, Current Transformers, Model FC, p. 6-7, www.flex-core.com, no date.

Phleps, Stefanie, Supplementary European Search Report for Application EP12815135, Jan. 19, 2015, EPO, The Hague.

Electric Power Research Institute, Inc. Sensor Technologies for a Smart Transmission System, An EPRI White Paper, Dec. 2009, Palo Alto, CA.

* cited by examiner

SENSOR AND METHOD FOR IDENTIFYING DOWNED POWER TRANSMISSION CONDUCTORS AND STRUCTURES

BACKGROUND OF THE INVENTION

This application relates to a sensor and method for identifying downed power transmission conductors and structures, and more particularly, to a sensor and method used to determine the inclination of power transmission conductors and structures.

Power transmission conductors (or bundles of them) are attached to support structures (poles or towers) utilizing attachment hardware and other structures such as insulators. Unfortunately, these physical connections can fail for a number of reasons:

1. Failure of hardware/insulator under wind or ice loading;
2. Fires on a wooden pole may cause the hardware to disconnect;
3. The pole itself may fail; or
4. The conductor itself may fail.

As a result of a failure, the power transmission conductor can either fall to the ground or hang closer to the ground creating a dangerous situation. If the conductor comes in contact with the ground it may cause protection to operate and the circuit to become denergized. If the protection does not operate it can be a hazard. If the conductor does not electrically come in contact with a grounded object, the protection will not operate. This will result in a low hanging conductor which may come in contact with humans or animals resulting in a hazard (a similar condition may happen if the conductor itself fails).

Accordingly, there is a need for a sensor than can notify a utility about such failures and low hanging conductors to permit the utility to take corrective actions such as: (1) denergizing the circuit, (2) deploying a field crew to repair the asset, and (3) make local authorities aware of the hazard in order to barricade the hazard.

BRIEF SUMMARY OF THE INVENTION

These and other shortcomings of the prior art are addressed by the present invention, which provides a sensor secured to a power transmission conductor or structure to alert a utility that the power transmission conductor or structure is down.

According to one aspect of the present invention, a method for identifying a downed power transmission conductor or structure includes the steps of securing a sensor to a power transmission conductor or structure, using the sensor to measure inclination of the power transmission conductor or structure, comparing the measured inclination to a set threshold, and alerting a utility if the measured inclination exceeds the set threshold.

According to another aspect of the invention, a method for identifying a downed power transmission conductor or structure including the steps of providing a sensor having an accelerometer adapted to measure inclination in three axes, securing the sensor to a power transmission conductor or structure, using the accelerometer to measure the inclination of the power transmission conductor or structure, comparing the measured inclination to a pre-determined threshold, and transmitting an alert to a utility when the measured inclination exceeds the pre-determined threshold.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
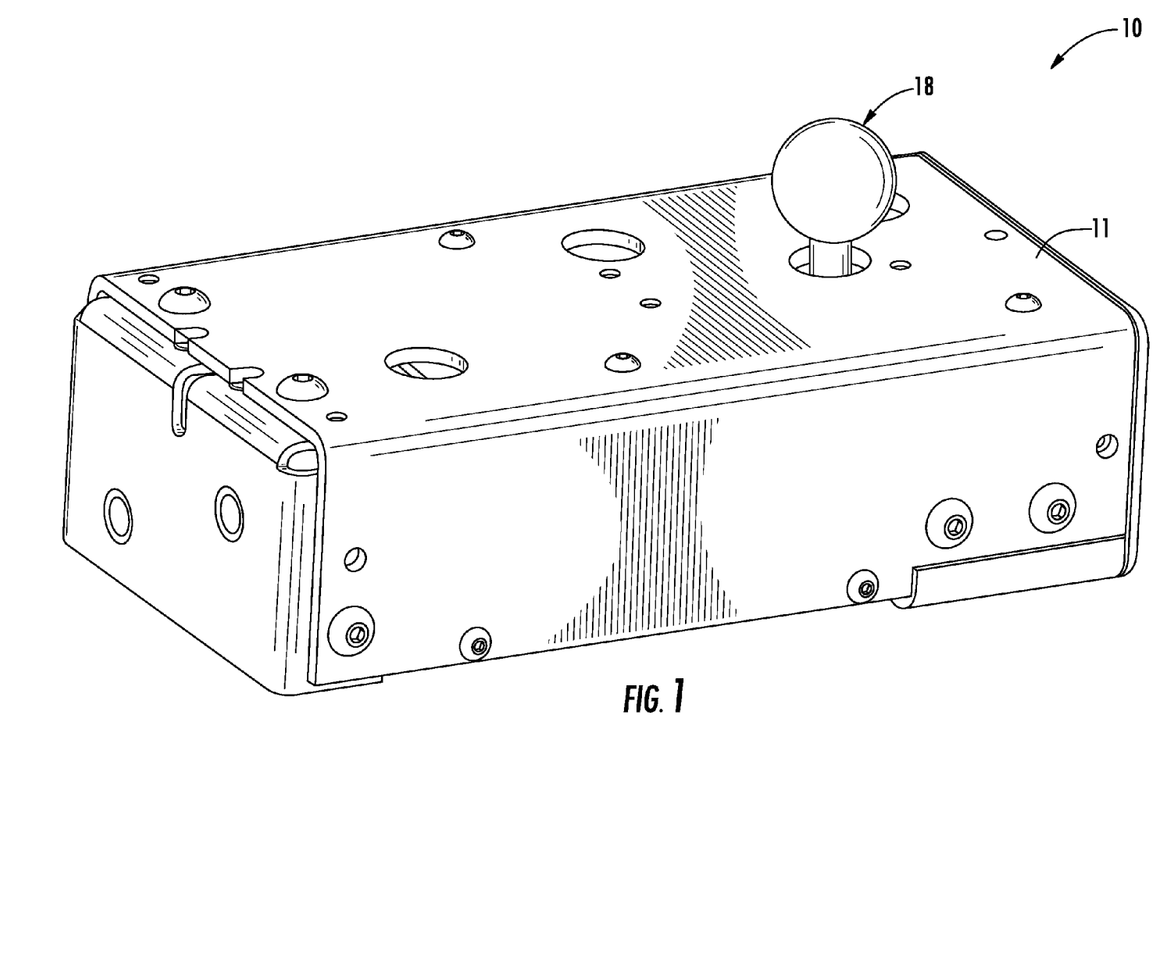
FIG. 1 is a perspective view of a sensor according to an embodiment of the invention.

Referring to the drawings, an exemplary sensor for identifying downed power cables and/or structures according to an embodiment of the invention is illustrated in FIG. 1 and shown generally at reference numeral 10. The sensor 10 is an RF sensor which attaches to power transmission conductors and/or support structures such as towers, poles, insulators, and any other suitable support structure or attachment device.

Figure 2:
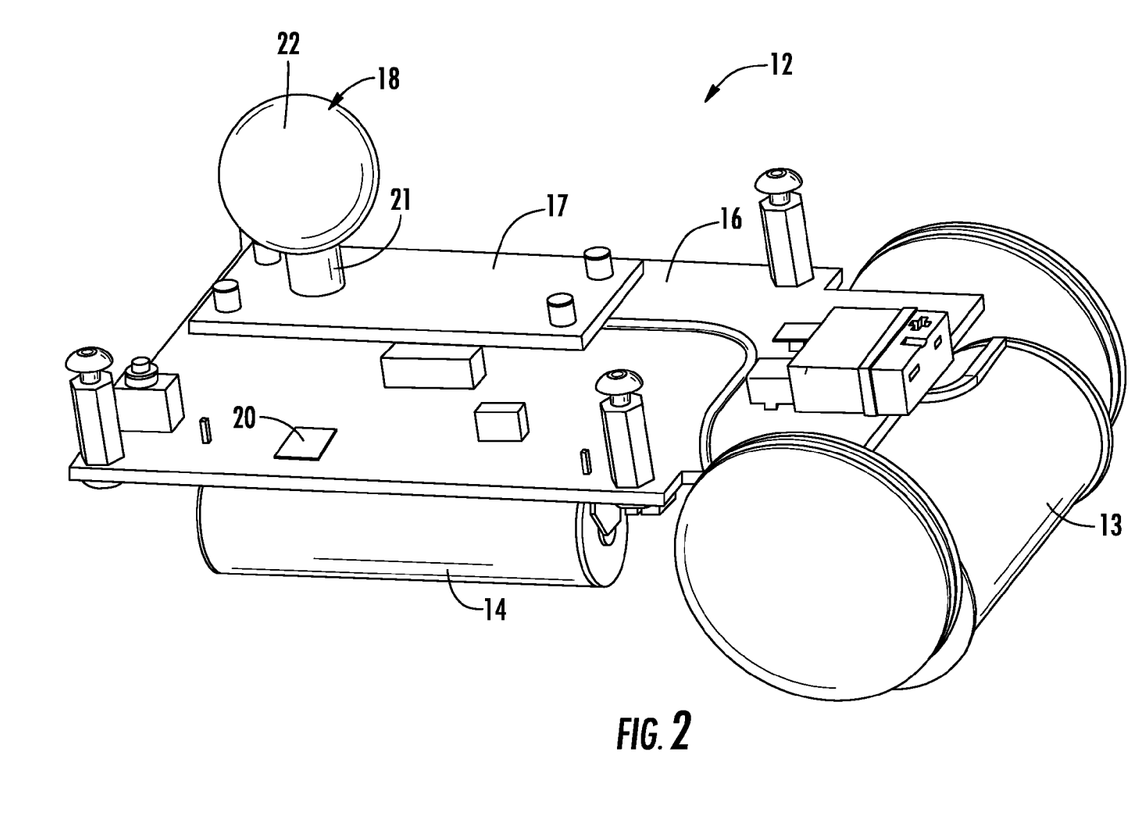
FIG. 2 shows electronics of the sensor of FIG. 1.

In general, the sensor 10 includes an electronics module 12, FIG. 2, contained in an electronics housing 11 that utilizes an accelerometer to measure the inclination of a power transmission conductor or support structure. If the conductor and/or structure changes in inclination outside of the normal everyday changes in inclination expected, utility personnel would be alerted. A sensor 10 attached to a conductor would inform on the status of a conductor, while a sensor 10 attached to a structure would inform on the condition of the structure (e.g. pole). The sensor 10 may also measure a transient acceleration event when "failure" happens. It should be appreciated that the electronics housing 11 may be of different forms or designs based on the application of the sensor 10. It should also be appreciated that the electronics module 12 may include different layouts and circuits. The form, layout, or shape of the electronics housing 11 and electronics module 12 are for illustrative purposes only.

Figure 3:
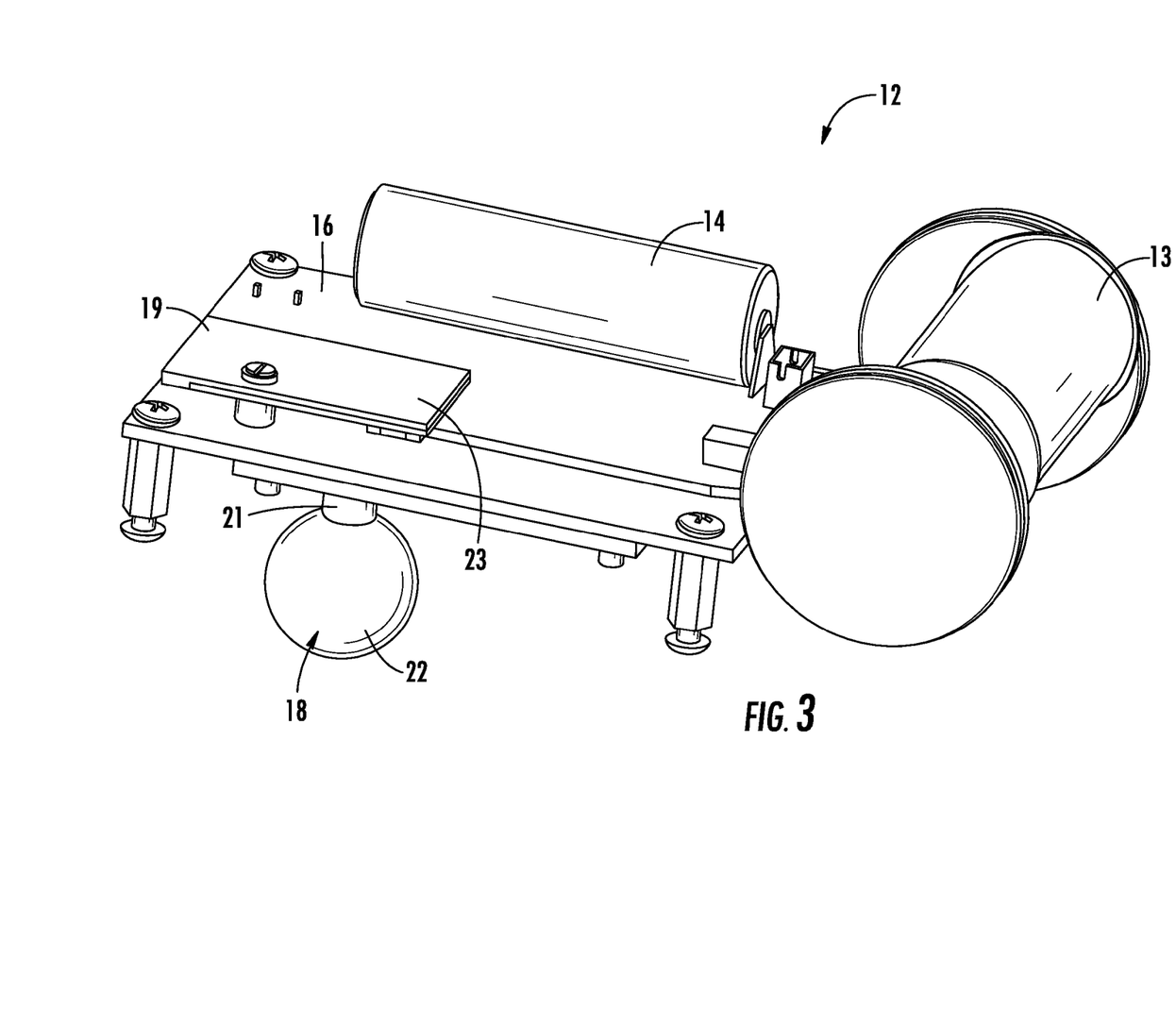
FIG. 3 shows electronics of the sensor of FIG. 1.

Referring to FIGS. 2 and 3 an example electronics module 12 is shown. The electronics module 12 may include a coil 13 for capturing magnetic fields to power the sensor 10, a battery 14 for providing power to the sensor 10 when the sensor 10 is not powered by magnetic fields, a first electronic board 16, a second electronic board 17, an antenna 18 and matching strip-line PCB board 19. The coil 13 includes a ferrite core with windings wrapped around the core and is adapted to couple with a magnetic field to harvest power therefrom and to measure the amount of current flowing. It should be appreciated that the battery 14 may be a non-rechargeable or rechargeable battery adapted to be recharged by the coil 13 when needed. Further, it should be appreciated that a supercap lithium battery combination may be employed for high power and lower temperature operation.

The first electronic board 16 performs power harvesting, measurement and processing, storage of signals, and controls the whole measurement communications process. The board 16 has inputs for voltage from the coil 13 and measures the voltage from the coil 13 to get a measurement of current flowing through a conductor. The voltage from the coil 13 is also harvested to power the sensor 10. The board 16 also includes a 3D accelerometer chip 20 which takes samples from DC to greater than 100 Hz. The accelerometer 20 is a solid state accelerometer.

The second electronic board 17 is an RF transmitter. The board 17 is adapted for plug and play so that different RF boards can be utilized to enable different communications protocols, frequencies, and/or methods. The board 17 provides for two way RF communications to allow firmware of the sensor 10 to be updated or reset and to allow data to be downloaded from the sensor 10 to a remote location having computers or processors with software adapted to perform specified calculations. Additionally, the RF communications may be point-to-point (sensor 10 to a base station), mesh (sensor 10 to sensor 10 to sensor 10 to repeater to . . . base station), sensor 10 to satellite, and sensor 10 to handheld or vehicle mounted receiver. All of the electronics and RF communications are designed to be very low power to enable power harvesting and long battery life.

The antenna 18 includes a stalk 21 that extends through the housing 11 and an antenna ball 22 and is electrically connected to the board 17. The diameter of the ball and the height of the stalk are optimized for both RF transmission and omni-directional beam pattern. Further, the shape of the antenna ball is optimized to prevent corona. A matching strip-line PCB board 23 is electrically connected to the antenna 18 and sits behind the antenna 18 to ensure that power is fully transmitted to the antenna 18.

In operation, the sensor 10 can perform on board measurements and algorithms/calculations for present conductor and ambient temperature—rolling average, present current, maximum temperature, current at the time of maximum temperature, histogram of temperatures (# of minutes/hour in a specific temperature range), inclination in three axes, raw vibration waveforms in three axes—10 second clips, Fast Fourier Transform of the waveform to provide frequency content of vibration waveform, and calculate displacement from the acceleration measured.

Figure 4:
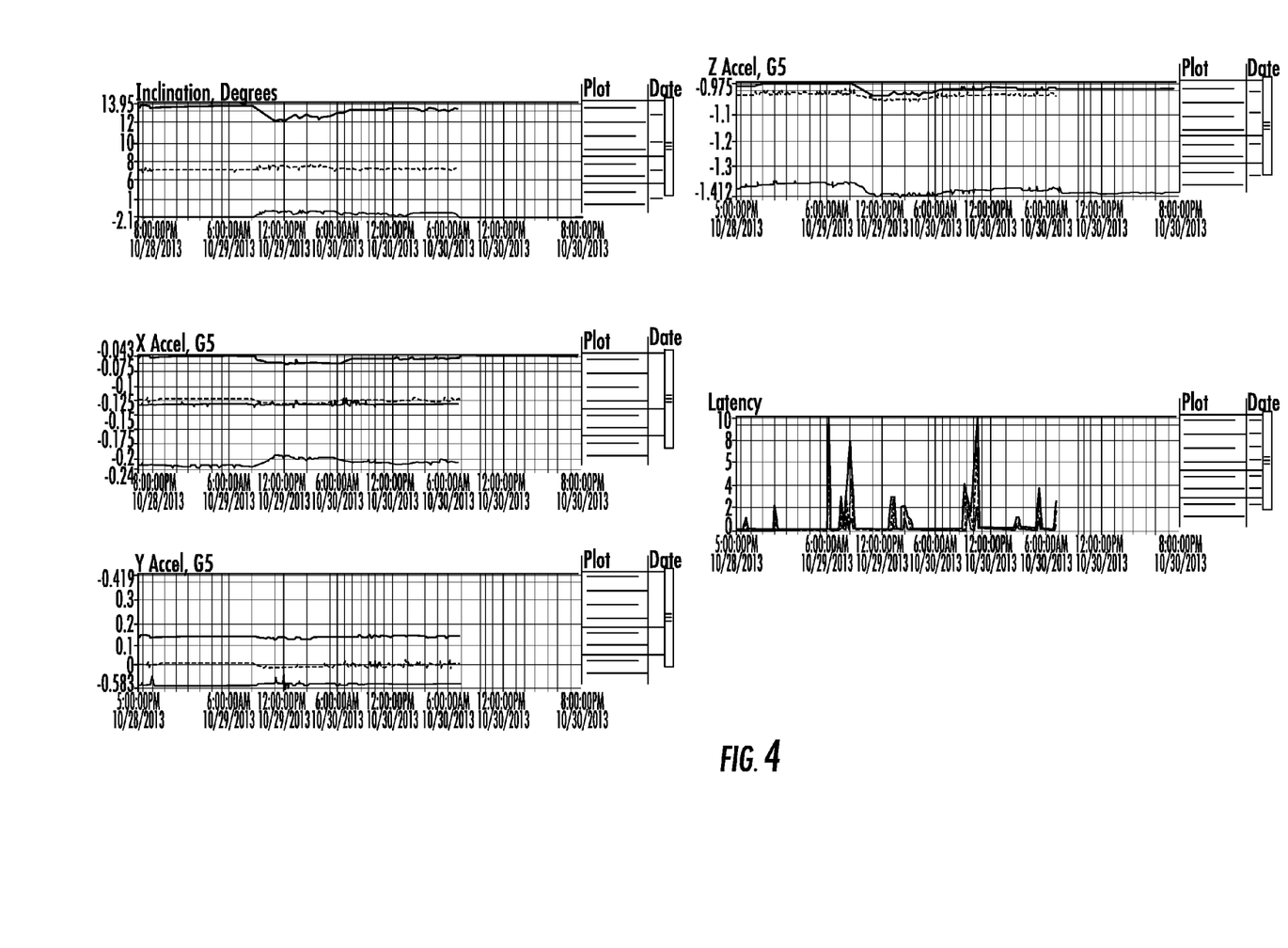
FIG. 4 shows inclinations and accelerations of the sensor of FIG. 1 installed on a power transmission conductor.

For purposes of determining whether a power transmission conductor or structure is downed, the sensor 10 uses the accelerometer 20 to determine inclination and acceleration in three axes. The sensor 10 may measure itself and compare against a threshold (either inclination or transient) or send data to a base station or server where the data is analyzed. If the data measured is out of compliance with the threshold, then an alarm is sent to the utility, indicating that a conductor or structure is down. Example measurements are shown in FIG. 4.

Figure 5:
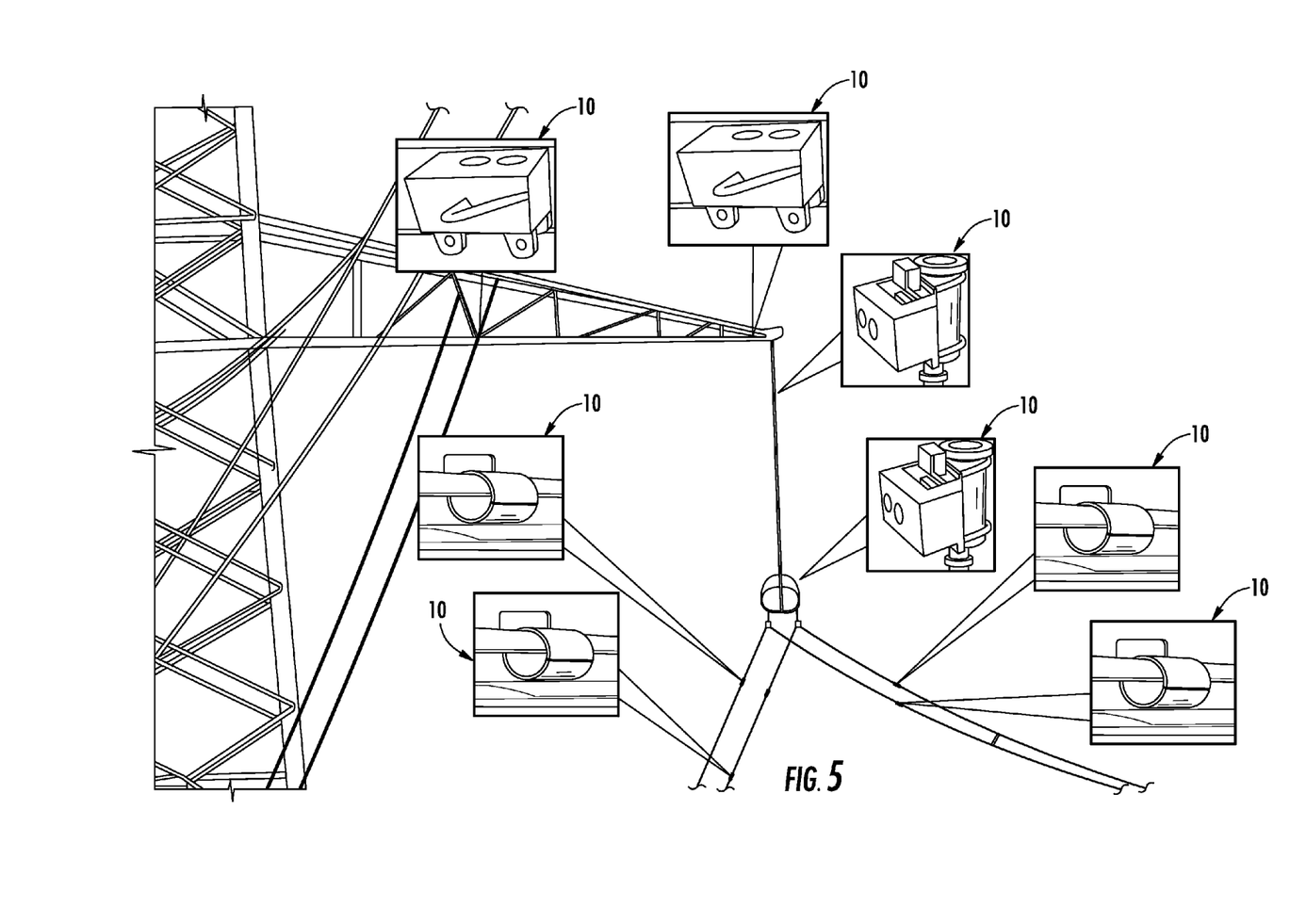
FIG. 5 illustrates a system of sensors of FIG. 1 used to monitor power transmission conductors and structures.

The sensor 10 may be used in different forms for different applications. For example, the sensor 10 may be employed on a power transmission conductor; an insulator; or a support structure. In the case of the support structure, the sensor 10 is secured directly to the structure, see FIG. 5. In the case of a power transmission conductor, the sensor 10 may be connected to a jaw assembly 31, FIG. 6, such as that described in U.S. application Ser. No. 13/551,085, hereby incorporated herein by reference, and secured to the power transmission line using the jaw assembly 31. In the case of insulators, the sensor 10 is integrated into another chassis adapted for use with insulators, such as that described in U.S. patent application Ser. Nos. 13/728,462 and 13/728,484, hereby incorporated by reference. As shown in FIG. 5, a plurality of sensors 10 may be used in their differing forms at the same time.

Example of Power Transmission Cable Use

Figure 6:
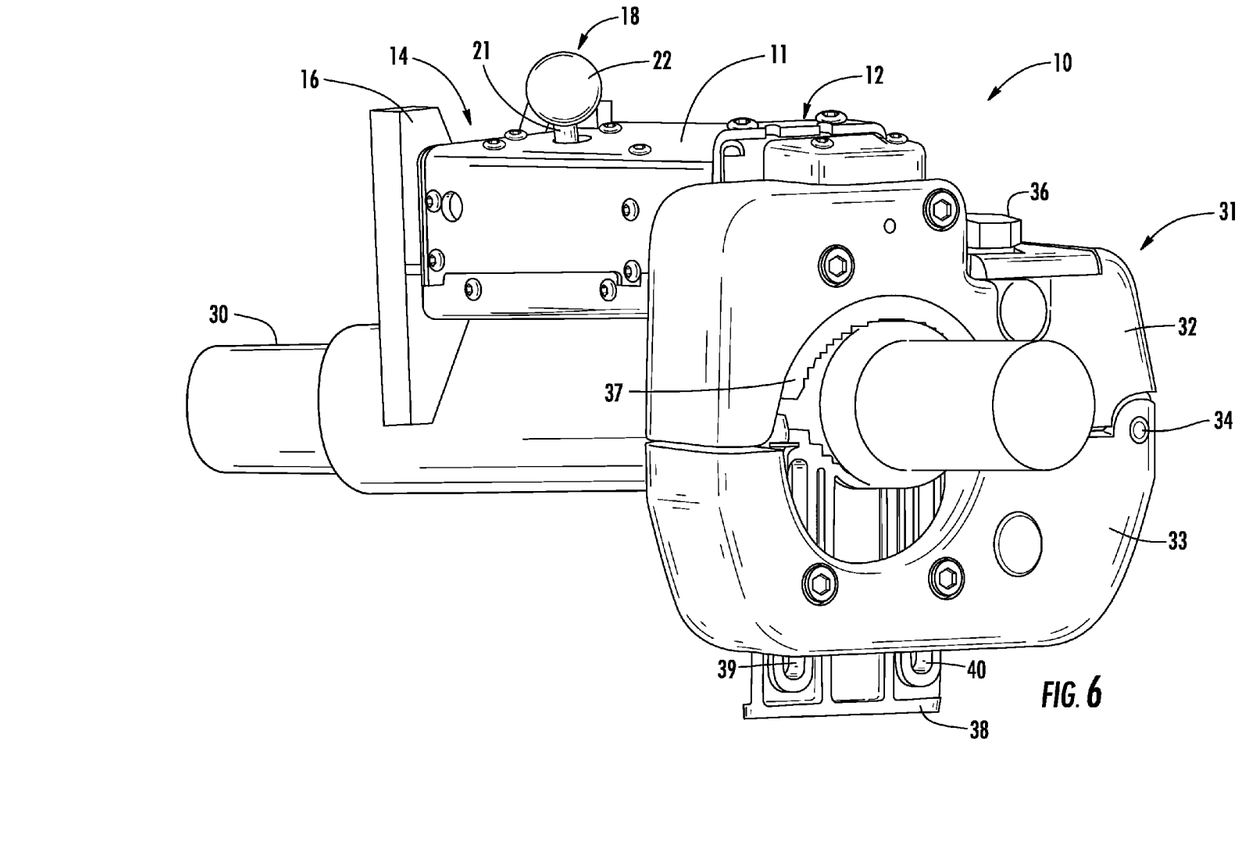
FIG. 6 is a perspective view of the sensor of FIG. 1 connected to a jaw assembly for attachment to a power transmission conductor.

As shown in FIG. 6, when using the sensor 10 on a power transmission conductor 30, the sensor 10 is connected to a jaw assembly 31. As shown, the jaw assembly 31 includes a first jaw 32 pivotally attached to a second jaw 33 via pivot joint 34 to allow the jaw assembly 31 to move between an open position, to receive a conductor 30 therein, and closed position, to secure the sensor 10 to the conductor 30. The jaw assembly 31 is secured in the closed position by a fastener 36 which extends through the first and second jaws 32, 33. The fastener 36 may be tightened by a standard wrench or socket type tool. The jaw assembly 31 is designed to allow the sensor to be placed on an energized conductor with a hot stick.

The jaw assembly 13 further includes an adjustable clamping assembly having first and second clamping mechanisms 37, 38. Both clamping mechanisms 37 and 38 include a concave inner surface to complement the rounded outside surface of the conductor 30. The inner surfaces also include a plurality of steps that act like teeth to secure the sensor 10 to the conductor 30. Together, the concave inner surfaces and steps of the clamping mechanisms 37, 38 allow the clamping assembly to mate with and secure the sensor 10 to various sized conductors, i.e., conductors of different diameters. As shown, the clamping assembly is made of a thermoplastic; however, other suitable materials may be used.

Clamping mechanism 38 includes elongated slots 39 and 40 adapted to receive fasteners therethrough. The slots 39, 40 allow the clamping mechanism 38 to be slidably mounted to jaw 33 to allow the clamping assembly to be moved from a non-clamping position, to receive conductors of varying diameters, to a clamping position to secure the sensor 10 to the conductor 30.

The foregoing has described a sensor for identifying downed power cables and structures. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

I claim:

1. A method for identifying a downed power transmission conductor or structure, comprising the steps of:
   (a) securing a sensor to a power transmission conductor or structure;
   (b) using the sensor to measure inclination of the power transmission conductor or structure;
   (c) using the sensor to measure acceleration of the power transmission conductor or structure in three axes with respect to gravity to provide a displacement of the power transmission conductor or structure;
   (d) comparing the measured inclination and acceleration to a set threshold, wherein if the measured inclination and acceleration is less than the set threshold the displacement is due to wind or other disturbance and if the measured inclination and acceleration exceeds the set threshold the displacement is due to a power transmission conductor or structure falling; and
   (e) alerting a utility if the measured inclination or acceleration exceeds the set threshold.

2. The method according to claim 1, wherein the step of comparing is performed by the sensor.

3. The method according to claim 1, wherein the step of comparing further includes the step of transmitting the measured inclination to a base station to allow the base station to compare the measured inclination to the set threshold.

4. A method for identifying a downed power transmission conductor or structure, comprising the steps of:
  (a) providing a sensor having an accelerometer adapted to measure inclination and acceleration in three axes with respect to gravity;
  (b) securing the sensor to a power transmission conductor or structure using a jaw assembly having a first jaw pivotally connected to a second jaw to allow the jaw assembly to move between an open position to receive the power transmission conductor or structure and a closed position to secure the sensor to the power transmission conductor or structure, the jaw assembly further including an adjustable clamping assembly having first and second clamping mechanisms adapted to clamp onto energized power transmission conductors of various sizes;
  (c) using the accelerometer to measure the inclination and acceleration of the power transmission conductor or structure;
  (d) comparing the measured inclination and acceleration to a pre-determined threshold wherein if the measured inclination and acceleration is less than the set threshold the displacement is due to wind or other disturbance and if the measured inclination and acceleration exceeds the set threshold the displacement is due to a power transmission conductor or structure falling; and
  (e) transmitting an alert to a utility when the measured inclination or acceleration exceeds the pre-determined threshold.

5. The method according to claim 4, wherein the step of securing the sensor to a power transmission conductor further includes the step of connecting the sensor to the jaw assembly.

6. The method according to claim 4, wherein the step of comparing is performed by the sensor.

7. The method according to claim 4, wherein the step of comparing further includes the step of transmitting the measured inclination to a base station to allow the base station to compare the measured inclination to the set threshold.

8. The method according to claim 7, wherein the sensor uses a radio frequency transmitter to transmit the measured inclination to the base station.

* * * * *